July 2, 1963     K. E. BOLEN     3,096,380
METHOD FOR THE DEHYDRATION OF LIQUIDS
Filed Aug. 28, 1959
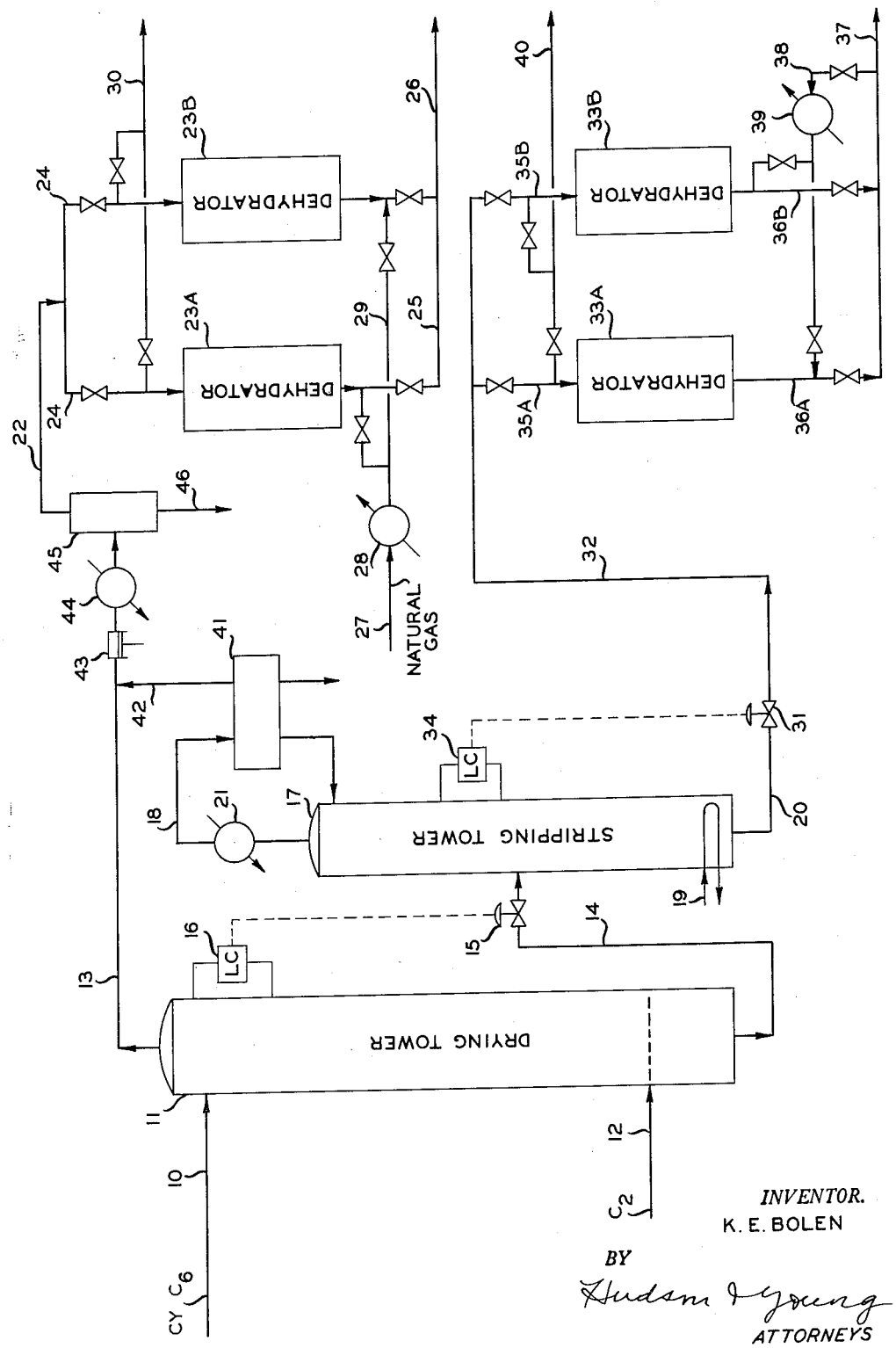
INVENTOR.
K. E. BOLEN
BY
Hudson & Young
ATTORNEYS

United States Patent Office 3,096,380
Patented July 2, 1963

3,096,380
METHOD FOR THE DEHYDRATION OF LIQUIDS
Kenneth E. Bolen, Pasadena, Tex., assignor to Phillips Petroleum Company, a corporation of Delaware
Filed Aug. 28, 1959, Ser. No. 836,816
7 Claims. (Cl. 260—666)

This invention relates to an improved method for the dehydration of liquids. In one of its aspects, the invention relates to the removal of water from a liquid, especially a liquid hydrocarbon, employing a light hydrocarbon gas as a selective dehydrating medium. In another of its aspects, the invention relates to the removal of contaminants, especially moisture, from liquid solvents, especially liquid hydrocarbon solvents, utilizing ethylene as a selective purifying agent. In still another aspect, this invention relates to an improved method for the dehydration of cyclohexane, by first contacting countercurrently with partially dried ethylene gas followed by further dehydration by contacting with a desiccant, and for the regeneration of a desiccant used for the dehydration.

It is frequently desirable and many times necessary to remove either the greater portion of water or the last traces of moisture from liquid hydrocarbons, such as liquid hydrocarbon solvents. For example, it may be necessary to remove the last traces of moisture from certain liquid hydrocarbon substances, such as gasoline, cyclohexane, etc., to forestall detrimental catalytic effects or other adverse effects, such as corrosion and the like. It is known that adsorbent materials, such as bauxite, activated alumina, silica gel and the like, have desiccating properties and that such materials may be reactivated and reused by heating to drive out adsorbed water. The above-mentioned adsorbents have a limited capacity for water, and require reactivation or regeneration, which involves heating the entire bed and sweeping out the adsorbed water removable at the reactivation temperature.

In accordance with conventional practice, solid desiccant materials which have become inactive due to adsorption of water are regenerated by heating the desiccant with hot gases. Quite often, the hot gas utilized to reactivate the desiccant bed is the same fluid as the fluid being dehydrated. The hot gases are passed through the desiccant from which they extract the water as water vapor. The extracted gases containing the water vapor are either wasted or cooled below their dew point to condense the water vapor therein.

Many fluids which are dehydrated and which may be used to reactivate solid desiccants utilized for the dehydration must be obtained in a substantially pure form so that they can be reutilized in the process from which they have been removed. One such material is cyclohexane which is an excellent solvent in the polymerization of ethylene to polyethylene since, for best operation of the polymerization process, the cyclohexane solvent utilized must be substantially pure and free of contaminants. When drying substantially pure cyclohexane, it is necessary to discard the cyclohexane employed for regeneration of the desiccant because the cyclohexane withdrawn from the desiccant bed on regeneration contains contaminants which have a deleterious effect on the catalyst in the polymerization process. In accordance with the present invention, an improved method is provided which materially reduces the amount of expensive cyclohexane lost in the regeneration of desiccants utilized to dehydrate cyclohexane that is used as a solvent, especially in the production of polyethylene.

In accordance with the present invention, I have found that, by first partially drying a solvent, such as cyclohexane, with a light hydrocarbon gas, such as ethylene, and then subjecting partially dried cyclohexane and ethylene to dehydration by contacting with individual beds of solid desiccant, the amount of solvent lost due to regeneration of the desiccant is materially reduced by reducing the number of cycles of regeneration of the desiccant.

It is an object of this invention to dehydrate liquids containing water. It is another object of this invention to provide a method for the dehydration of liquid hydrocarbon solvents. It is another object of this invention to provide an improved method for the dehydration of hydrocarbon solvents and reducing the number of regeneration cycles of the solid desiccant used to dehydrate the solvent. It is still a further object to provide a continuous method for dehydrating liquid hydrocarbon with a light hydrocarbon gas and a solid desiccant and regenerating a solid desiccant with a portion of the gas dehydrated.

Other aspects, objects, as well as the several advantages of this invention, are apparent from a study of this disclosure, the drawing and the appended claims.

In accordance with the present invention, a method is provided for dehydrating a liquid, especially liquid hydrocarbon solvents, such as cyclohexane, which comprises contacting said liquid under dehydration conditions of temperature and pressure with a gas, especially a light hydrocarbon gas, such as ethylene, to remove a substantial portion of the moisture content of said liquid, and recovering said liquid substantially reduced in moisture content as a product of the method.

In accordance with a specific embodiment of the present invention, a method is provided for dehydrating a cyclohexane solvent which comprises contacting said cyclohexane containing moisture with a partially dried ethylene gas as the dehydrating agent under dehydrating conditions to partially dehydrate said cyclohexane, stripping ethylene dehydrating agent from said partially dehydrated cyclohexane, combining ethylene dehydrating agent containing moisture and stripped dehydrating agent and drying same by contacting with a solid desiccant, regenerating said ethylene desiccating agent with sweet natural gas, further dehydrating said partially dehydrated cyclohexane by contacting with a solid desiccant to remove final traces of moisture from said cyclohexane and regenerating said cyclohexane desiccating agent with dehydrated cyclohexane and recovering cyclohexane substantially free of moisture as a product of the method.

The present invention has several advantages over conventional methods of dehydration and for the regeneration of desiccants employed for dehydrating. First of all, by partially dehydrating the liquid hydrocarbon by contacting with a light hydrocarbon gas, the amount of water to be removed by the subsequent desiccant is materially reduced and thereby the number of regenerations reduced. Since the material being dehydrated is utilized for the regeneration, the amount of regeneration fluid to be discarded is also materially reduced. Furthermore, desiccant driers used for drying the gas dehydrating agent can be advantageously regenerated with an inexpensive sweet gas which makes the regeneration of these driers less expensive than the regeneration of the driers used for drying the liquid hydrocarbon.

The pressure employed during both dehydration and regeneration may range from about atmospheric to about 1,000 p.s.i.g. depending upon the composition of the liquid to be dried. To provide the greatest adsorptive capacity during dehydration, the temperature is generally kept as low as possible, preferably within the range of about 32 to 100° F. Higher temperatures may be used but the efficiency and extent of dehydration is impaired thereby due to the increased vapor pressure of water in the desiccant, for example, with increasing temperature. The temperature of the regeneration gas may range from about 250 to about 600° F. depending upon the desiccant employed. The preferred range is 400 to 600° F. when using materials such as bauxite and silica gel, although lower temperatures may be used with certain synthetic alumina.

The adsorbent materials that can be used in this invention are preferably such natural substances as bauxite, fuller's earth, acid clay, although excellent results are obtained at somewhat higher costs with such synthetic adsorbents as activated alumina, molecular sieves and silica gel. These adsorbent materials may be activated before use by calcining at temperatures of 500 to 1,500° F. The granular adsorbent materials are used in suitable particle size for permitting fluid flow without excessive pressure drop even in relatively deep beds and at flow rates consistent with efficient dehydration.

The gaseous dehydrating agents utilized by the practice of the present invention preferably comprise light hydrocarbon gases, such as methane, ethane, ethylene, propane, propylene, and the like. Ethylene is especially preferred in the partial dehydration of cyclohexane. This invention is applicable to the drying of any liquid, especially liquid hydrocarbons and more especially liquid hydrocarbon solvents, such as cyclohexane.

In order that this invention may be clearly understood, reference will be made to the accompanying drawing which diagrammatically illustrates apparatus which may be used for a continuous dehydration and regeneration method.

Referring now to the drawing, a liquid hydrocarbon solvent stream comprising cyclohexane containing moisture removed from an ethylene polymerization process, not shown, is passed by way of conduit 10 and introduced into an upper portion of drying tower 11. Introduced into a lower portion of drying tower 11 is a stream of a light hydrocarbon gas, such as ethylene, also containing a small amount of moisture, by way of conduit 12. Drying tower 11 is constructed in any desired manner and preferably contains contact surface supplying materials, such as baffles, rings, beads, etc., to cause intimate contact of the cyclohexane fed thereto with the ethylene also introduced thereto.

The ethylene introduced into the lower portion of drying tower 11 rises up through the tower countercurrent to cyclohexane moving downwardly therethrough. Within drying tower 11 the ethylene removes a substantial portion of the water or moisture present in the cyclohexane and is removed from the top of tower 11 by way of conduit 13. Partially dried cyclohexane is removed from the base of tower 11 by conduit 14, passed through control valve 15, which is controlled by liquid level controller 16 on the upper portion of column 11, and then introduced into stripping column 17.

Within stripping column 17, the partially dehydrated cyclohexane, which also contains some ethylene dehydrating agent, is heated by heating coils 19 or other suitable heating means to release residual ethylene contained in the cyclohexane which is removed from the top of column 17 by way of conduit 18. Partially dehydrated cyclohexane substantially free of ethylene dehydrating agent is removed from the base of column 17 by way of conduit 20. Ethylene containing moisture and some cyclohexane is removed overhead from column 17 by means of pipe 18 and passed through cooler 21 and introduced into accumulator 41. Condensed cyclohexane recovered in accumulator 41 is returned to column 17, and ethylene containing moisture and some uncondensed cyclohexane is removed by conduit 42.

Ethylene dehydrating agent removed from the top of columns 11 and 17 is compressed by compressor 43, cooled by exchanger 44, and then introduced into knockout zone 45, wherein condensed cyclohexane is removed by pipe 46, and the ethylene-containing stream is then passed into either solid desiccating unit 23A or 23B depending on which unit is on dehydration cycle and the other on regeneration. Assuming desiccating unit 23B is being regenerated, the wet ethylene dehydrating agent is passed through valved conduit 24 and introduced into desiccating unit 23A containing a suitable desiccant, such as a Linde 5A molecular sieve adsorbent. The 5A molecular sieve selectively adsorbs moisture in the presence of ethylene and cyclohexane and is preferred for units 23A and 23B. The Linde 5A molecular sieves have rigid three-dimensional anionic networks and average pore diameters of 5 angstrom units. Upon passing the ethylene through unit 23A, substantially all the moisture is adsorbed by the molecular sieve adsorbent and dry ethylene containing some cyclohexane is removed from unit 23A by way of valved conduit 25 and pipe 26 for use as desired. This stream is preferably returned to the polyethylene plant for use in the polymerization reactor.

Assuming unit 23B is being regenerated, a sweet natural gas, for example, introduced by conduit 27 is passed through heat exchanger 28 wherein it is heated and thence through conduit 29 and introduced into the lower portion of unit 23B. The hot regeneration gas is passed up through unit 23B to remove the adsorbed water from the molecular sieve adsorbent. The regeneration gas containing desorbed water vapor is removed from the top of 23B by way of valved conduit 30. The wet regeneration gas can be dehydrated, if desired, or utilized elsewhere as a wet gas, if desired. After unit 23B has been regenerated, that is, substantially all the moisture removed from the adsorbent and unit 23A is saturated with water, the operation of units 23A and 23B is switched. That is, 23A is being regenerated and 23B is utilized as the dehydrating unit. A regenerated bed of adsorbent is preferably cooled with dehydrated ethylene before being placed in adsorption service.

Partially dried cyclohexane removed from the base of stripping column 17 is passed by way of conduit 20, control valve 31, conduit 32 and introduced into either desiccating unit 33A or 33B. The flow rate of cyclohexane removed from tower 17 is controlled by the liquid level controller 34 on column 17 which controls the operation of valve 31. The operation of dehydrator units 33A and 33B containing a solid desiccant, such as bauxite, is similar to the operation described in connection with units 23A and 23B. When one of the units is being regenerated, the other is utilized for dehydration. The partially dehydrated cyclohexane is passed through either valved conduit 35A or 35B to the unit being used for dehydration and passed through the unit wherein final traces of moisture in the cyclohexane are adsorbed by the bauxite. Dehydrated cyclohexane substantially free of moisture is removed from the dehydrating units by way of valved conduit 36A or 36B and passed through conduit 37 for use as desired. The cyclohexane passed through conduit 37 which is substantially free of moisture and other contaminants is especially useful as a solvent in the process for the polymerization of ethylene to solid polymers.

A portion of the dehydrated cyclohexane passed through conduit 37 is utilized to regenerate one of the dehydrating agents and is passed through conduit 38, heater 39 and introduced into the base of the dehydrator to be regenerated. The hot cyclohexane gas is passed upwardly through the desiccant bed, removes the water as vapor in the gas and is removed from the top of the dehydrator unit and removed from the system by way of conduit 40. However, since this cyclohexane contains moisture as well as other contaminants which are poisonous to the catalyst in the polyethylene plant, this stream is not suitable for use as a solvent in the polymer plant but can be used elsewhere, if desired.

The following is a specific example of operation according to the present invention, as described above in connection with the attached drawing.

*Example*

In a specific example employing the flow arrangements described in connection with the drawing, cyclohexane containing 150 p.p.m. moisture is countercurrently contacted in drying tower 11 with ethylene containing 30 p.p.m. moisture at 100° F. and 20 p.s.i.g. Partially dried cyclohexane removed from the bottom of drying tower 11 contains 30 p.p.m. moisture.

Partially dried cyclohexane is stripped of ethylene in stripping tower 17 by heating to a temperature of 200° F. Wet ethylene removed from the top of drying tower 11 and stripping tower 17 is passed through a dehydrator containing a Linde 5A molecular sieve as a desiccant at 100° F. and at 500 p.s.i.g. The ethylene entering the dehydrator contains 300 p.p.m. moisture and the ethylene removed from the dehydrator contains 2 p.p.m. moisture.

Stripped partially dehydrated cyclohexane containing 10 p.p.m. moisture is passed through a dehydrator containing bauxite at 100° F. and 10 p.s.i.g. Cyclohexane removed from the dehydrator contains 2 p.p.m. moisture.

The ethylene dehydrators are regenerated with sweet natural gas and the cyclohexane dehydrators are regenerated with dehydrated cyclohexane.

The number of regenerations for the cyclohexane dehydrators is once each 30 days. The amount of cyclohexane discarded which was utilized as regeneration gas amounted to 600 gallons. By operation according to conventional procedure, wherein all of the cyclohexane is totally dried in the dehydrator, the number of regenerations with cyclohexane is once each 3 days and the amount of cyclohexane discarded is 600 gallons.

From the foregoing, it should be evident that there is provided, in accordance with this invention, an improved method for the dehydration of liquid hydrocarbons, such as cyclohexane, wherein a substantially moisture free product is obtained and, at the same time, the amount of cyclohexane discarded due to regeneration of the solid adsorbent utilized is materially reduced, i.e., about 10 times as much cyclohexane is discarded with conventional procedure as there is by the present invention.

Reasonable variation and modification are possible within the scope of the foregoing disclosure, drawing and the appended claims to the invention, the essence of which is that light hydrocarbon gases, such as ethylene, have been found to be excellently suitable for the dehydration of liquid solvents, especially liquid hydrocarbon solvents, and that certain modus operandi based upon this contribution have been contributed also.

I claim:

1. A method for step-wise dehydrating a liquid hydrocarbon solvent which comprises countercurrently contacting said liquid hydrocarbon in a dehydration zone with a hydrocarbon gas dehydrating medium at dehydration conditions of temperature and pressure to selectively absorb a substantial portion of the moisture contained in said liquid hydrocarbon, removing said dehydrating medium and absorbed moisture from said dehydration zone, removing partially dehydrated liquid hydrocarbon from said zone and passing said partially dehydrated liquid hydrocarbon to a stripping zone and therein stripping retained dehydrating medium therefrom, removing liquid hydrocarbon reduced in moisture and substantially free of said dehydration gas and passing same through a solid adsorbent dehydration zone to remove final traces of moisture from said liquid hydrocarbon, recovering said liquid hydrocarbon substantially free of moisture as a product of the method, and regenerating said adsorbent dehydration zone with a portion of said liquid hydrocarbon product.

2. A method according to claim 1 wherein at least a portion of said dehydrating medium recovered from said dehydration zone and said stripping zone is dried by passing same through a solid adsorbent dehydration zone and wherein at least a portion of the dehydrated dehydrating medium is recycled to the dehydration zone for reuse in the method.

3. A method according to claim 1 wherein said liquid hydrocarbon is cyclohexane.

4. A method according to claim 1 wherein said dehydrating medium is ethylene.

5. A method according to claim 2 wherein the solid adsorbent employed for dehydration of said dehydrating medium is a molecular sieve adsorbent and the adsorbent employed for said liquid hydrocarbon is bauxite.

6. A method according to claim 2 wherein said adsorbent for dehydration of said dehydrating medium is regenerated with a sweet natural gas and wherein said solid adsorbent for final dehydration of said liquid hydrocarbon is regenerated with a portion of the liquid hydrocarbon dehydrated and removed as a product of the method.

7. A method for the stepwise dehydration of cyclohexane which comprises countercurrently contacting said cyclohexane in a dehydration zone with ethylene, as the dehydrating medium, at dehydration conditions of temperature and pressure to selectively absorb a substantial portion of the moisture contained in said cyclohexane, removing ethylene and absorbed moisture overhead from said dehydration zone, passing partially dehydrated cyclohexane from the base of said dehydration zone to a stripping zone and therein stripping retained ethylene and moisture therefrom, removing cyclohexane reduced in moisture and substantially free of ethylene from the base of said stripping zone and passing same through a solid adsorption zone to remove final traces of moisture from said cyclohexane, recovering said cyclohexane substantially free of moisture from said dehydration zone as product, and regenerating said dehydration zone with a portion of said liquid cyclohexane product.

References Cited in the file of this patent

UNITED STATES PATENTS

| | | |
|---|---|---|
| 1,873,136 | Laird | Aug. 23, 1932 |
| 2,383,362 | Batchelder | Aug. 21, 1945 |
| 2,449,617 | Peet | Sept. 21, 1948 |
| 2,909,572 | Solomon | Oct. 20, 1959 |
| 2,910,139 | Matyear | Oct. 27, 1959 |